US006990475B2

(12) United States Patent
Kondo et al.

(10) Patent No.: US 6,990,475 B2
(45) Date of Patent: Jan. 24, 2006

(54) DIGITAL SIGNAL PROCESSING METHOD, LEARNING METHOD, APPARATUS THEREOF AND PROGRAM STORAGE MEDIUM

(75) Inventors: Tetsujiro Kondo, Tokyo (JP); Masaaki Hattori, Chiba (JP); Tsutomu Watanabe, Kanagawa (JP); Hiroto Kimura, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 11/074,420

(22) Filed: Mar. 8, 2005

(65) Prior Publication Data

US 2005/0154480 A1 Jul. 14, 2005

Related U.S. Application Data

(63) Continuation of application No. 10/089,463, filed as application No. PCT/JP01/06594 on Jul. 31, 2001, now Pat. No. 6,907,413.

(30) Foreign Application Priority Data

Aug. 2, 2000 (JP) ............................ 2000-238897

(51) Int. Cl.
*G06F 15/18* (2006.01)
*G10I 15/00* (2006.01)

(52) U.S. Cl. .......................... 706/16; 706/21; 704/233; 704/242

(58) Field of Classification Search .................. 706/16, 706/21; 704/233, 242
See application file for complete search history.

(56) References Cited

U.S. PATENT DOCUMENTS

| | | | | |
|---|---|---|---|---|
| 4,720,802 | A | 1/1988 | Damoulakis et al. | 704/233 |
| 5,555,465 | A | 9/1996 | Kondo | 348/571 |
| 5,586,215 | A | 12/1996 | Stork et al. | 704/232 |
| 5,739,873 | A | 4/1998 | Kondo | 348/720 |
| 5,764,305 | A | 6/1998 | Kondo | 348/571 |
| 5,828,993 | A * | 10/1998 | Kawauchi | 704/202 |
| 5,903,866 | A | 5/1999 | Shoham | 704/265 |
| 6,532,443 | B1 * | 3/2003 | Nishiguchi et al. | 704/200.1 |
| 6,910,010 | B2 * | 6/2005 | Iwahashi et al. | 704/233 |
| 2001/0056349 | A1 * | 12/2001 | St. John | 704/270 |

FOREIGN PATENT DOCUMENTS

| | | |
|---|---|---|
| EP | 865028 | 9/1998 |
| EP | 912045 | 4/1999 |
| JP | 57-144600 | 9/1982 |
| JP | 60-195600 | 10/1985 |
| JP | 04-115628 | 4/1992 |
| JP | 05-297898 | 11/1993 |
| JP | 05-323999 | 12/1993 |
| JP | 06-051800 | 2/1994 |
| JP | 7-67031 | 3/1995 |

(Continued)

*Primary Examiner*—George Davis
(74) *Attorney, Agent, or Firm*—Frommer Lawrence & Haug LLP; William S. Frommer

(57) ABSTRACT

Power spectrum data is calculated from a digital audio signal D10. A part of power spectrum data is extracted from thus calculated power spectrum data. Classification is made based on the extracted part of power spectrum data. And the digital audio signal D10 is converted by a predicting method that corresponds to the classified class. Thereby, conversion further adapted to the characteristic of the digital audio signal D10 can be performed.

3 Claims, 7 Drawing Sheets

FOREIGN PATENT DOCUMENTS

| | | |
|---|---|---|
| JP | 7-193789 | 7/1995 |
| JP | 8-275119 | 10/1996 |
| JP | 10-307599 | 11/1998 |
| JP | 10-313251 | 11/1998 |
| JP | 11-027564 | 1/1999 |
| JP | 2000-32402 | 1/2000 |
| JP | 2000-78534 | 3/2000 |
| JP | 2002-49383 | 2/2002 |
| JP | 2002-49384 | 2/2002 |
| JP | 2002-49395 | 2/2002 |
| JP | 2002-49396 | 2/2002 |
| JP | 2002-49397 | 2/2002 |
| JP | 2002-49400 | 2/2002 |
| WO | WO 98/051072 | 11/1998 |

* cited by examiner

DIGITAL SIGNAL PROCESSING METHOD, LEARNING METHOD, APPARATUS THEREOF AND PROGRAM STORAGE MEDIUM

This is a continuation of application Ser. No. 10/089,463, filed Mar. 29, 2002, now U.S. Pat. No. 6,907,413, which is a 371 of PCT/JP01/06594, filed Jul. 31, 2001, the entirety of which is incorporated herein by reference.

FIELD OF THE ART

The present invention relates to a digital signal processing method, a learning method, apparatuses thereof and a program storage medium, and is suitably applied to a digital signal processing method, a learning method, apparatuses thereof and a program storage medium for performing the interpolation processing of data on a digital signal in a rate converter, a pulse code modulation (PCM) decoding device, etc.

BACKGROUND ART

Heretofore, before a digital audio signal is supplied to a digital-to-analog converter, oversampling processing is performed to severalfold convert a sampling frequency from the original value. Therefore, in a digital audio signal outputted from the digital-to-analog converter, the phase characteristic of an analog anti-alias filter is kept at the upper area of an audio-frequency, and the influence of digital image noise accompanied with the sampling is removed.

In the above oversampling processing, generally, a digital filter by linear interpolation system of first degree is applied. Such digital filter generally generates linear interpolation data by obtaining the mean value of plural existent data when sampling rate has changed or data has defected.

Although the data quantity of the digital audio signal after oversampling processing becomes accurate severalfold in the time axis direction by linear interpolation of first degree, however, the frequency band of the digital audio signal after oversampling processing is almost the same as before conversion; the sound quality itself is not improved. Furthermore, since all of the interpolated data were not generated based on the waveform of the analog audio signal before A/D conversion, the reproducibility of waveform is scarecely improved.

On the other hand, when digital audio signals having a different sampling frequency are dubbed, the frequency is converted with a sampling rate converter. In such case, however, to improve the sound quality and the reproducibility of waveform have been difficult because only linear interpolation of data by a linear primary digital filter cannot be performed. It is similar to the case where the data sample of the digital audio signal has defaulted.

DISCLOSURE OF INVENTION

Considering the above points, the present invention provides a digital signal processing method, a learning method, apparatuses therefor and a program storage medium that can further improve the reproducibility of the waveform of a digital audio signal.

To solve the above problems, power spectrum data is calculated from a digital audio signal. A part of power spectrum data is extracted from thus calculated power spectrum data. Classification is made based on the extracted part of power spectrum data. And the digital audio signal is converted by a predicting method that corresponds to the classified class. Thereby, conversion further adapted to the characteristic of the digital audio signal can be performed.

BEST MODE FOR CARRYING OUT THE INVENTION

An embodiment of the present invention will be described in detail with reference to the accompanying drawings.

Figure 1:
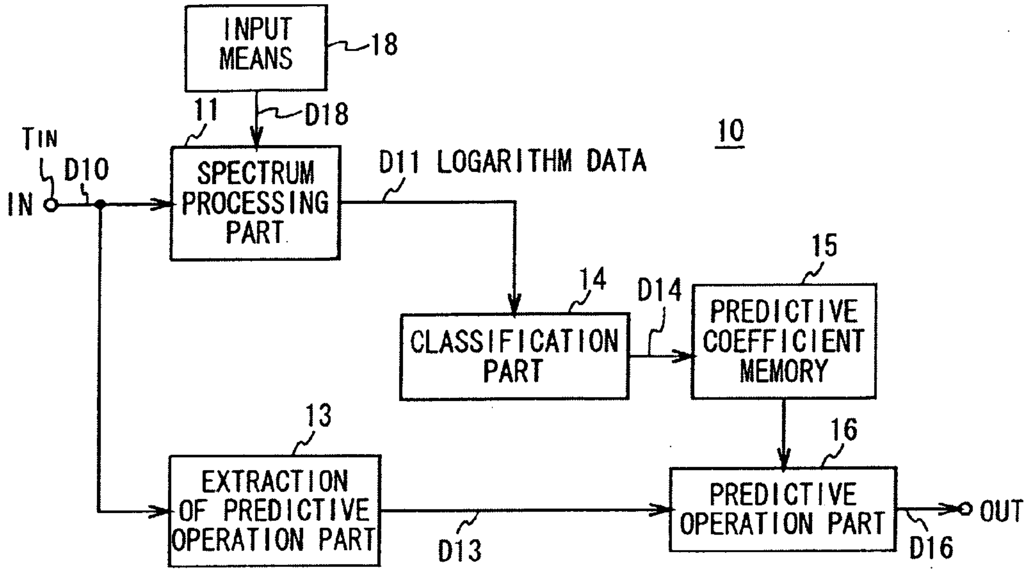
FIG. 1 is a functional block diagram showing an audio signal processing device according to the present invention.

Referring to FIG. 1, an audio signal processing device 10 raises the sampling rate of a digital audio signal (hereinafter, this is referred to as audio data), or when in interpolating the audio data, it generates audio data that is close to a true value by processing applying classification.

In this connection, the audio data in this embodiment is music data that represents human's voice, sound of instruments, or data that represents other various sound.

Specifically, in the audio signal processing device 10, a spectrum processing part 11 forms a class tap being time axis waveform data that input audio data D10 supplied from an input terminal $T_{IN}$ has cut into areas for each predetermined time (in this embodiment, for example six samples each). Then, on the above formed class tap, the spectrum processing part 11 calculates logarithm data according to control data D18 supplied from input means 18 by a logarithm data calculating method that will be described later.

With respect to the class tap of the input audio data D10 formed at this time, the spectrum processing part 11 calculates logarithm data D11 that is the result of the logarithm data calculating method and will be classified, and supplying this to a classifying part 14.

The classifying part 13 has an adaptive dynamic range coding (ADRC) circuit part for compressing logarithm data D11 supplied from the spectrum processing part 11 and generating a compressed data pattern, and a class code generator part for generating a class code that the logarithm data D11 belongs to.

The ADRC circuit part performs an operation on the logarithm data D11 such as compressing it for example from 8 bits to 2 bits, and forming pattern compression data. This ADRC circuit part is to perform adaptive quantization. Here, since the local pattern of a signal level can be efficiently represented by short word length, the ADRC circuit part is used to generate the classification code of a signal pattern.

In the concrete, when six 8-bit data (logarithm data) is tried to be classified, it must be classified into a large number of classes $2^{48}$; load on the circuit increases. Then, in the classifying part 14 of this embodiment, classification is performed based on the pattern compression data generated in the ADRC circuit part provided in its inside. For instance, if one bit quantization is executed on six logarithm data, the six logarithm data can be represented by 6 bits and classified into $2^6$=64 classes.

Here, if assuming a dynamic range in a sliced area as DR, bit allocation as "m", the data level of each logarithm data as L and quantization code as Q, the ADRC circuit part evenly divides between the maximum value MAX and the minimum value MIN in the area by a specified bit length and performing quantization according to the following equation:

$$DR=\mathrm{MAX}-\mathrm{MIN}+1\quad Q=\{(L-\mathrm{MIN}+0.5)\times 2^m/DR\} \tag{1}$$

Note that, in Equation (1), { } means processing for omitting the figures after the decimal fractions. Thus, if each of the six logarithm data calculated in the spectrum processing part 11 is formed by for example 8 bits (m=8), each of them is compressed to 2 bits in the ADRC circuit part.

If assuming each of thus compressed logarithm data as $q_n$ (n=1 to 6), based on the compressed logarithm data $q_n$, a class code generator part provided in the classifying part 14 executes an operation shown by the following equation:

$$\text{class} = \sum_{i=1}^{n} q_i (2^P)^i \tag{2}$$

Thereby, a class code "class" showing a class that the block ($q_1$ to $q_6$) belongs to is calculated. The class code generator part supplies class code data D14 representing the above calculated class code "class" to a predictive coefficient memory 15. This class code "class" shows a read address when the predictive coefficient is read from the predictive coefficient memory 15. In this connection, in Equation (2), "n" represents the number of the compressed logarithm data $q_n$: in this embodiment, n=6, and P represents bit allocation: in this embodiment, P=2.

In this manner, the classifying part 14 generates the class code data D14 of the logarithm data D11 calculated from the input audio data D10, and supplying this to the predictive coefficient memory 15.

In the predictive coefficient memory 15, a set of predictive coefficients that correspond to each class code has been respectively stored in an address corresponding to the class code. The set of predictive coefficients $W_1$ to $W_n$ stored in an address corresponding to the class code is read based on the class code data D14 supplied from the classifying part 14 and supplied to a predictive operation part 16.

On audio waveform data (predictive tap) D13 ($X_1$ to $X_n$) that has sliced from the input audio data D10 based on a time axis area in the predictive operating part extracting part 13 and will be subjected to predictive operation, and the predictive coefficients $W_1$ to $W_n$, the predictive operation part 16 performs a product-sum operation shown by the following equation:

$$y'=w_1x_1+w_2x_2+\ldots+w_nx_n \tag{3}$$

Thereby, a predicted result y' is obtained. This predicted value y' is outputted from the predictive operation part 16 as audio data D16 improved in sound quality.

Figure 2:
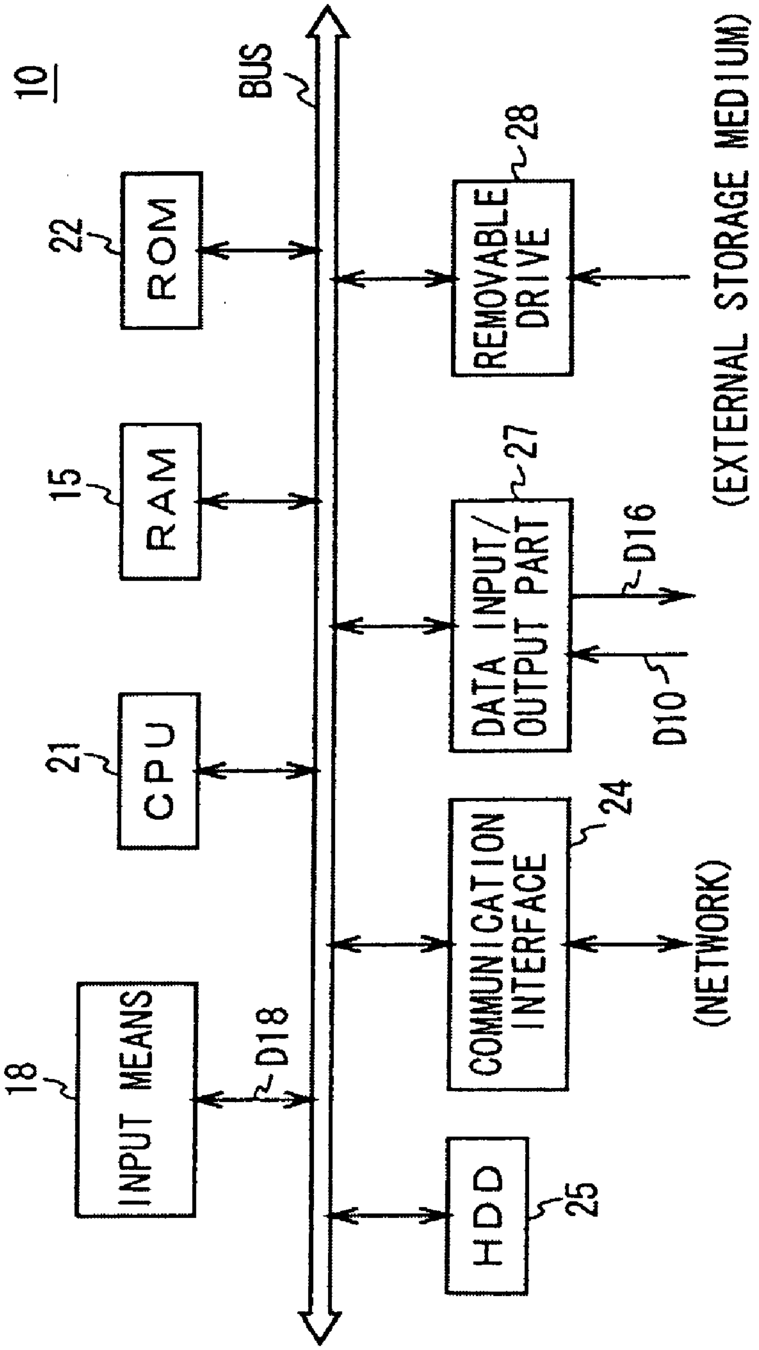
FIG. 2 is a block diagram showing the)audio signal processing device according to the present invention.

Note that, as the configuration of the audio signal processing device 10, the functional block described above with reference to FIG. 1 has been shown, however, in this embodiment, as a concrete configuration forming this functional block, an apparatus having a computer configuration shown in FIG. 2 is used. More specifically, referring to FIG. 2, the audio signal processing device 10 has a configuration that a CPU 21, a read only memory (ROM) 22, a random access memory (RAM) 15 that forms the predictive coefficient memory 15, and respective circuit parts are respectively connected via a bus BUS. The CPU 11 executes various programs stored in the ROM 22. Thereby, they work as each functional block described above with reference to FIG. 1 (spectrum processing part 11, predictive operating part extracting part 13, classifying part 14 and predictive operation part 16).

Furthermore, the audio signal processing device 10 has a communication interface 24 for performing communication with a network, and a removable drive 28 for reading information from an external storage medium such as a floppy disk, a magneto-optical disk. Thus, also, via the network or from the external storage medium, each program to perform the processing applying classification described above with reference to FIG. 1 can be read to the hard disk of a hard disk device 25, and the processing applying classification can be performed according to the above read program.

A user makes the CPU 21 the classification processing described above with reference to FIG. 1 by entering various command via the input means 18 such as a keyboard, mouse. In this case, the audio signal processing device 10 inputs audio data (input audio data) D10 that its sound quality should be improved via a data I/O part 27, and performs processing applying classification on the above input audio data D10, and then can output audio data D16 improved in sound quality to the outside via the data I/O part 27.

Figure 3:
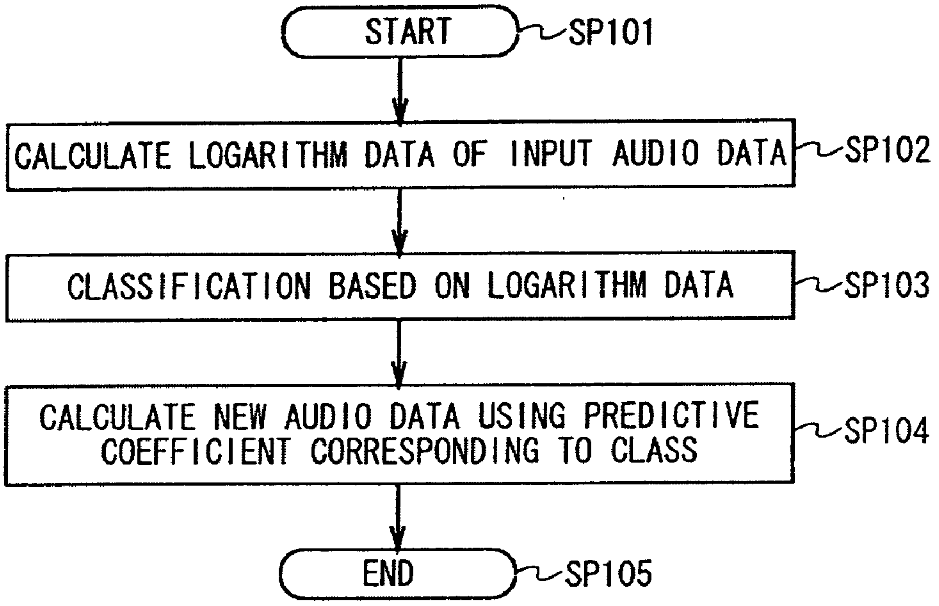
FIG. 3 is a flowchart showing the processing procedure for converting audio data.

FIG. 3 shows the processing procedure of the processing applying classification in the audio signal processing device 10. If entering the above processing procedure from step SP101, in the following step SP102, the audio signal processing device 10 calculates the logarithm data D11 of the input audio data D10 in the spectrum processing part 11.

This calculated logarithm data D11 is to represent the characteristic of the input audio data D10. The audio signal processing device 10 proceeds to step SP103 to classify the input audio data D10 based on the logarithm data D11 by the classifying part 14. Then, the audio signal processing device 10 reads a predictive coefficient from the predictive coefficient memory 15 by means of a class code obtained by the classification. This predictive coefficient has been previously stored corresponding to each class by learning. By reading a predictive coefficient corresponding to a class code, the audio signal processing device 10 can use a predictive coefficient that fits to the characteristic of the logarithm data D11 at this time.

The predictive coefficient read from the predictive coefficient memory 15 is used in predictive operation by the predictive operation part 16 in step SP104. Thereby, the input audio data D10 is converted to desired audio data D16 by a predictive operation adapted to the characteristic of the logarithm data D11. Thus, the input audio data D10 is converted to the audio data D16 improved in sound quality. Then the audio signal processing device 10 proceeds to step SP105 to finish the above processing procedure.

Next, a calculating method of, the logarithm data D11 of the input audio data D10 in the spectrum processing part 11 of the audio signal processing device 10 will be described.

Figure 4:
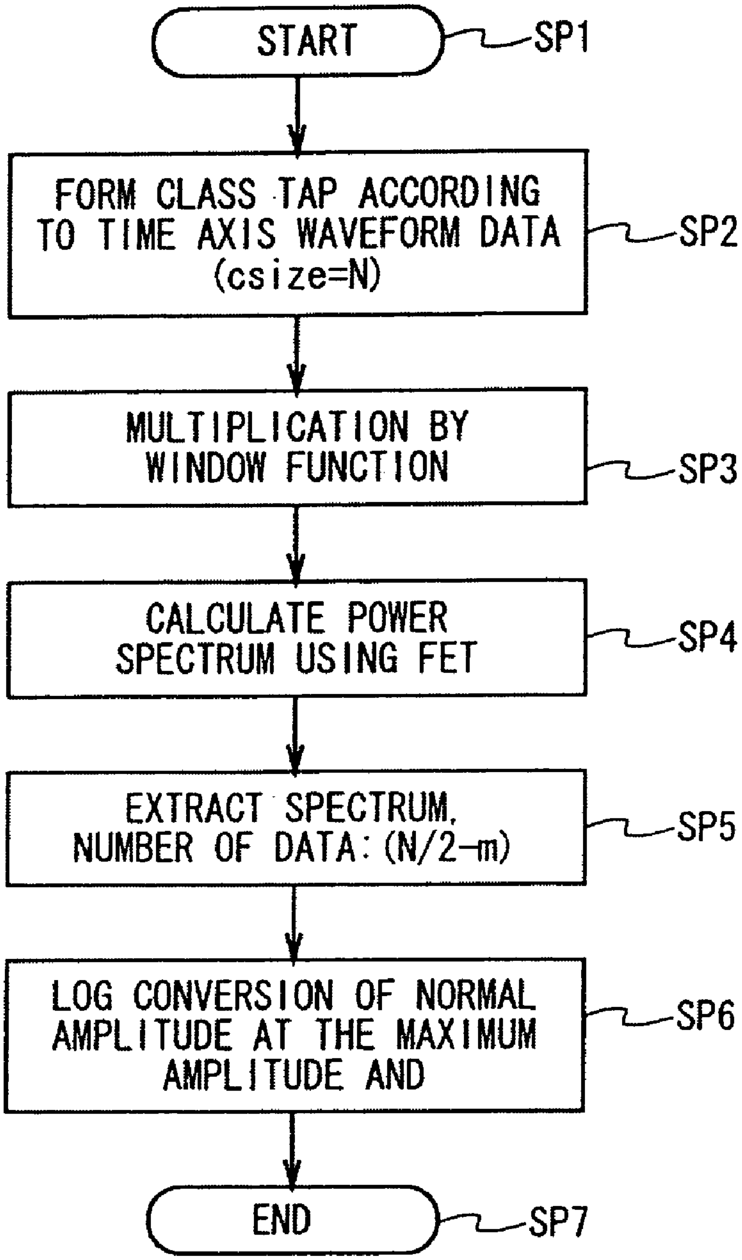
FIG. 4 is a flowchart showing the processing procedure for calculating logarithm data.

FIG. 4 shows the processing procedure of the logarithm data calculating method in the spectrum processing part 11, If entering the above processing procedure from step SP1, in the following step SP2, the spectrum processing part 11 forms a class tap being time axis waveform data that the input audio data D10 has sliced into an area for each predetermined time, and proceeds to step SP3.

In step SP3, if assuming an window function to class tap as "W(K)", the spectrum processing part 11 calculates multiplication data according to the Hamming window shown by the following equation:

$$W[k]=0.45+0.46*\cos(\pi*k/N)\ \langle k=0\ \ldots,\ N-1\rangle \quad (4)$$

Then the spectrum processing part 11 proceeds to step SP4. In this connection, in the multiplication processing of this window function, to improve the accuracy of frequency analysis that will be performed in the following step SP4, the first value and the last value of each class tap formed at this time are made to be equal. Besides, in Equation (1), "N" represents the sample number of Hamming window, and "k" represents the order of sample data.

Figure 5:
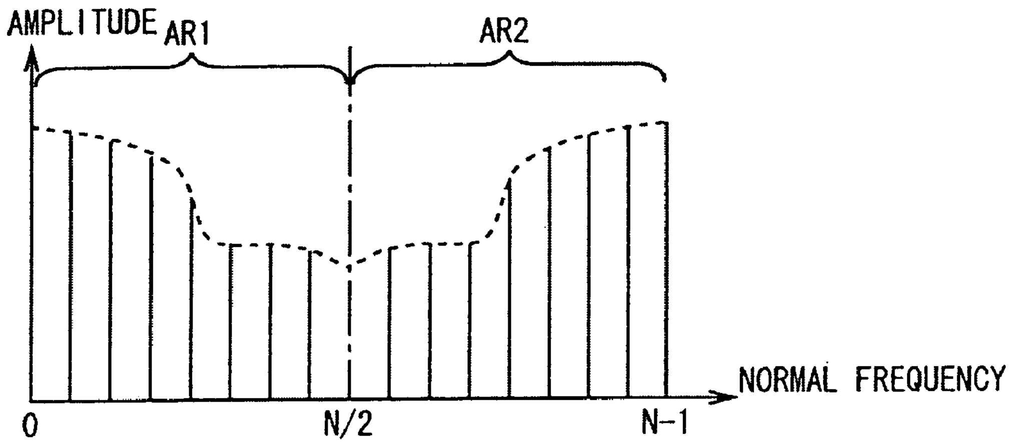
FIG. 5 is a schematic diagram showing an example of calculation of power spectrum data.

In step SP4, the spectrum processing part 11 performs fast Fourier transform (FFT) on the multiplication data, and calculating power spectrum data as shown in FIG. 5, and proceeds to step SP5.

In step SP5, the spectrum processing part 11 extracts only significant power spectrum data from the power spectrum data.

In this extracting processing, in the power spectrum data calculated from N pieces of multiplication data, a power spectrum data group AR2 (FIG. 5) that is rightward from N/2 has the almost same component as a power spectrum data group AR1 (FIG. 5) that is leftward from zero value to N/2 (that is, it is symmetry.) This means that the components of the power spectrum data at two frequency points that they are in the frequency band of the N pieces of multiplication data and there are at equal distance from the both ends, are mutually conjugate. Accordingly, the spectrum processing part 11 sets only the power spectrum data group AR1 (FIG. 5) that is leftward from zero value to N/2.

And the spectrum processing part 11 extracts with excepting "m" pieces of power spectrum data other than that the user previously selectively set via the input means 18 (FIGS. 1 and 2), in the power spectrum data group AR1 set as the object to be extracted at this time.

In the concrete, in the case where the user selectively set so as to for example further improve the sound quality of human's voice via the input means 18, the control data D18 according to the above selective operation is outputted from the input means 18 to the spectrum processing part 11 (FIGS. 1 and 2). Thereby, the spectrum processing part 11 extracts only power spectrum data around 500 Hz to 4 kHz that is significant in human's voice, from the power spectrum data group AR1 (FIG. 5) extracted at this time (that is, the power spectrum data other than the power spectrum data near the 500 Hz to 4 kHz is the "m" pieces of power spectrum data that should be excepted.)

On the other hand, in the case where the user performed selection so as to for example further improve music via the input means 18 (FIGS. 1 and 2), control data D18 according to the above selective operation is outputted from the input means 18 to the spectrum processing part 11. Thereby, the spectrum processing part 11 extracts only power spectrum data around from 20 Hz to 20 kHz that is significant in music, from the power spectrum data group AR1 (FIG. 5) extracted at this time. (That is, the power spectrum data other than the power spectrum data around 20 Hz to 20 kHz is the "m" pieces of power spectrum data that should be excepted.)

In this manner, the control data D18 outputted from the input means 18 (FIGS. 1 and 2) seals a frequency component to be extracted as significant power spectrum data. It reflects the intent of the user who performs selective operation by hand via the input means 18 (FIGS. 1 and 2).

Accordingly, the spectrum processing part 11 for extracting power spectrum data based on the control data D18 extracts the frequency component of a particular audio component as significant power spectrum data when the user desired output of high sound quality.

In this connection, the spectrum processing part 11 expresses the interval of the original waveform in the power spectrum data group AR1 to be extracted. Thus, the spectrum processing part 11 extracts except for also power spectrum data having a DC component that does not have significant characteristics.

In this manner, in step SP5, the spectrum processing part 11 excepts the "m" pieces of power spectrum data from the power spectrum data group AR1 (FIG. 5) according to the control data D18, and extracts only the absolute minimum power spectrum data in which also power spectrum data having a DC component has excepted, that is, significant power spectrum data, and proceeds to the following step SP6.

In step SP6, for the extracted power spectrum data, the spectrum processing part 11 calculates the maximum value (ps_max) of the power spectrum data (ps[k]) extracted at this time, according to the following equation:

$$ps\_\max=\max(ps[k]) \quad (5)$$

The spectrum processing part 11 performs normalization (division) by the maximum value (ps_max) of the power spectrum data (ps[k]) extracted at this time according to the following equation:

$$psn[k]=ps[k]/ps\_\max \quad (6)$$

And the spectrum processing part 11 performs logarithm (decibel value) conversion to the reference value (psn[k]) obtained at this time, according to the following equation:

$$psl[k]=10.0*\log(psn[k]) \quad (7)$$

In this connection, in Equation (7), "log" is a common logarithm.

In this manner, in step SP6, the spectrum processing part 11 performs the normalization at the maximum amplitude and the logarithm conversion of amplitude to also find a characteristic part (significant small waveform part), and calculating logarithm data D11 that it makes people who listens the sound hear it comfortably. Then the spectrum processing part 11 proceeds to the following step SP7 to finish the logarithm data calculation processing.

The spectrum processing part 11 can calculate the logarithm data D11 in that the characteristic of the signal waveform represented by the input audio data D10 has further found, by the logarithm data calculation processing of the logarithm data calculating method Next, a learning circuit to previously obtain the set of predictive coefficients for each class at the time when they will be stored in the predictive coefficient memory 15 described above with reference to FIG. 1 by learning will be described.

Figure 6:
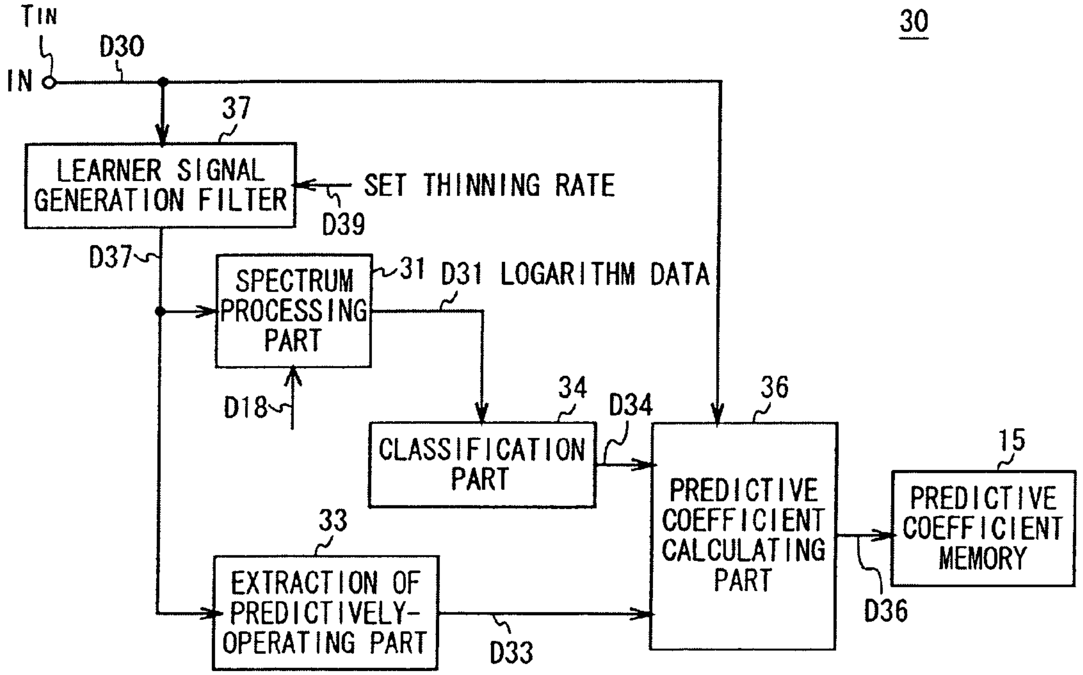
FIG. 6 is a block diagram showing the configuration of a learning circuit.

Referring to FIG. 6, a learning circuit 30 receives supervisor audio data D30 of high sound quality by a learner signal generation filter 37. The learner signal generation filter 37 thins out the supervisor audio data D30 by predetermined samples for every predetermined time at a thinning rate set by a thinning rate setting signal D39.

In this case, a predictive coefficient to be generated differs depending on a thinning rate in the learner signal generation filter 37. According to this, also audio data to be represented in the aforementioned audio signal processing device 10 differs. For instance, when the sound quality of audio data is tried to be improved by raising a sampling frequency in the aforementioned audio signal processing device 10, thinning processing to reduce the sampling frequency is performed in the learner signal generation filter 37. On the other hand, when the improvement of sound quality is contrived by compensating the omitted data sample of the input audio data D10 in the aforementioned audio signal processing device 10, thinning processing to omit a data sample is performed in the learner signal generation filter 37 according to that.

Thus, the learner signal generation filter 37 generates learner audio data D37 from the supervisor audio data 30 by predetermined thinning processing, and supplies this to a spectrum processing part 31 and a predictively-operating part extracting part 33, respectively.

The spectrum processing part 31 divides the learner audio data D37 supplied from the learner signal generation filter 37 into areas for every predetermined time (in this embodiment, for example for every 6 samples). Then, with respect to the waveform of each of the above divided time areas, the spectrum processing part 31 calculates logarithm data D31 that is the calculated result by the logarithm data calculating method described above with reference to FIG. 4 and should be classified, and supplying this to a classifying part 34.

The classifying part 34 has an ADRC circuit part for compressing the logarithm data D31 supplied from the spectrum processing part 31 and generating a compressed data pattern, and a class code generater part for generating a class code that the logarithm data D31 belongs to.

The ADRC circuit part performs an operation so as to compress the logarithm data D31 for example from 8 bits to 2 bits, and forming pattern compression data. This ADRC circuit part is to perform adaptive quantization. Here, since the local pattern of a signal level can be efficiently represented by short word length, the ADRC circuit part is used to generate the classification code of a signal pattern.

In the concrete, when six 8-bit data (logarithm data) is tried to be classified, it must be classified into a large number of classes $2^{48}$; load on the circuit increases. Then, in the classifying part 34 of this embodiment, classification is performed based on pattern compression data generated in the ADRC circuit part provided in its inside. For instance, if one bit quantization is executed on six logarithm data, the six logarithm data can be represented by 6 bits and classified into $2^6=64$ classes.

Here, if assuming a dynamic range in a sliced area as DR, bit allocation as "m", the data level of each logarithm data as L and quantization code as Q, the ADRC circuit part evenly divides between the maximum value MAX and the minimum value MIN in the area by a specified bit length and performing quantization by operations similar to the aforementioned Equation (1). Thus, if each of the six logarithm data calculated in the spectrum processing part 31 is formed by for example 8 bits (m=8), each of them will be compressed to 2 bits in the ADRC circuit part.

If assuming thus compressed logarithm data as $q_n$ (n =1 to 6) respectively, the class code generator part provided in the classifying part 34 calculates a class code "class" showing a class that the block ($q_1$ to $q_6$) belongs to by executing an operation similar to the aforementioned Equation (2) based on the compressed logarithm data $q_n$, and supplies class code data D34 representing the above calculated class code "class" to a predictive coefficient calcualting part 36. In this connection, in Equation (2), "n" represents the number of the compressed logarithm data $q_n$: in this embodiment, n=6, and P represents bit allocation: in this embodiment, P=2.

In this manner, the classifying part 34 generates the class code data D34 of the logarithm data D31 supplied from the spectrum processing part 31, and supplies this to the predictive coefficient calculating part 36. In addition, to this, audio waveform data D33 ($x_1, x_2, \ldots, x_n$) in a time axis area corresponding to the class code data D34 is sliced in the predictively-operating part extracting part 33 and supplied to the predictive coefficient calculating part 36.

The predictive coefficient calculating part 36 stands a normal equation using the class code "class" supplied from the classifying part 34, the audio waveform data D33 sliced for each class code "class" and the supervisor audio data D30 of high sound quality supplied from an input terminal $T_{IN}$.

That is, the levels of "n" samples of the learner audio data D37 are assumed as $x_1, x_2, \ldots, x_n$, respectively, and quantization data as the result of p-bit ADRC are assumed as $q_1, \ldots, q_n$, respectively. At this time, a class code "class" in this area is defined as the aforementioned Equation (2) Then, as described above, when the levels of the learner audio data D37 are respectively assumed as $x_1, x_2, \ldots x_n$ and the level of the supervisor audio data D30 of high sound quality is assumed as "y", the equation of linear estimation of "n" taps by predictive coefficients $w_1, w_2, \ldots, w_n$ is set for each class code. This is as the following equation:

$$y=w_1x_1+w_2x_2+\ldots+w_nx_n \tag{8}$$

Before learning, $W_n$ is an indeterminate coefficient.

In the learning circuit 30, learning is performed to plural audio data for each class code. When the number of data sample is M, the following equation:

$$y_k=w_1x_{k1}+w_2x_{k2}+\ldots w_nx_{kn} \tag{9}$$

is set according to the aforementioned Equation (8). However, k=1, 2, . . . M.

In case of M>n, the predictive coefficients $w_1, \ldots w_n$ are not decided uniquely. Thus, the element of an error vector "e" is defined by the following equation:

$$e_k=y_k-\{w_1x_{k1}+w_2x_{k2}+\ldots w_nx_{kn}\} \tag{10}$$

(however, k=1, 2, . . . , M). And a predictive coefficient which makes the following equation:

$$e^2=\sum_{k=0}^{M}e_k^2 \tag{11}$$

minimum is obtained. It is a "solution by minimum square method".

Here, the partial-differential coefficient of $w_n$ is obtained by Equation (11). In this case, each $W_n$ (n=1 to 6) may be obtained so as to make the following equation:

$$\frac{\|e^2}{\|wi} = \sum_{k=0}^{M} 2\left[\frac{\|e_k}{\|wi}\right]e_k = \sum_{k=0}^{M} 2X_{ki} \cdot e_k = \sum_{k=0}^{M} 2X_{ki} \cdot e_k (i = 1, 2 \ldots n) \tag{12}$$

"0". Then, if defining $X_{ij}$, $Y_i$ as the following equations:

$$X_{ij} = \sum_{p=0}^{M} X_{pi} \cdot X_{pj} \tag{13}$$

$$Y_i = \sum_{k=0}^{M} X_{ki} \cdot Y_k \tag{14}$$

Equation (12) is represented by means of a matrix.

$$\begin{bmatrix} X_{11} & X_{12} & \cdots & \cdots & X_{1n} \\ X_{21} & X_{22} & \cdots & \cdots & X_{2n} \\ \vdots & \vdots & & & \\ \vdots & \vdots & & & \\ X_{ml} & X_{m2} & \cdots & \cdots & X_{mn} \end{bmatrix} \begin{bmatrix} W_1 \\ W_2 \\ \vdots \\ \vdots \\ W_n \end{bmatrix} = \begin{bmatrix} Y_1 \\ Y_2 \\ \vdots \\ \vdots \\ Y_n \end{bmatrix} \tag{15}$$

This equation is generally called normal equation. Note that, here, n=6.

After the input of all of the learning data (supervisor audio data D30, class code "class" and audio waveform data D33) has completed, the predictive coefficient calculating part 36 stands the normal equation shown by the aforementioned Equation (15) to each class code "class", solves this normal equation as to each $W_n$ by using a common matrix solution such as a sweep method, and calculating a predictive coefficient for each class code. The predictive coefficient calculating part 36 writes each calculated predictive coefficient (D36) in the predictive coefficient memory 15.

As the result of such learning, in the predictive coefficient memory 15, a predictive coefficient to estimate audio data "y" of high sound quality is stored for each class code depending on a pattern defined by the quantization data $q_1, \ldots, q_6$. This predictive coefficient memory 15 is used in the audio signal processing device 10 described above with reference to FIG. 1. By the above processing, the learning of predictive coefficients to generate audio data of high sound quality from normal audio data according to the linear estimation method finishes.

As the above, the learning circuit 30 performs the thinning processing of supervisor audio data of high sound quality by the learner signal generation filter 37 considering the degree of that interpolation processing in the audio signal processing device 10. Thereby, a predictive coefficient for interpolation processing in the audio signal processing device 10 can be generated.

According to the above configuration, the audio signal processing device 10 performs fast Fourier transform to the input audio data D10, and calculates a power spectrum on a frequency axis. The frequency analysis (fast Fourier transform) can find a slight difference that cannot be known by time axis waveform data. Therefore, the audio signal processing device 10 can find fine characteristics that cannot be found in a time axis area.

In the state where fine characteristics can be found (that is, in the state where the power spectrum has calculated), the audio signal processing device 10 extracts only significant power spectrum data (i.e., N/2−m piece) according to selective area setting means (selective setting that will be performed by hand by the user from the input means 18).

Thereby, the audio signal processing device 10 can further reduce load on processing, and can improve processing speed.

As the above, the audio signal processing device 10 calculates power spectrum data that can find fine characteristics and further extracts only significant power spectrum data from the calculated power spectrum data by performing frequency analysis. Accordingly, the audio signal processing device 10 extracts only significant power spectrum data that is irreducibly minimum, and specifies the class based on the above extracted power spectrum data.

Then, the audio signal processing device 10 performs predictive operation to the input audio data D10 based on the extracted significant power spectrum data by means of a predictive coefficient based on the specified class. Thereby, the above input audio data D10 can be converted to audio data D16 further improved in sound quality.

Moreover, at the time of learning to generate a predictive coefficient for each class, predictive coefficients which respectively correspond to many supervisor audio data having different phase are previously obtained. Thereby, even if phase shift has occurred at the time of processing applying classification on the input audio data D10 in the audio signal processing device 10, processing corresponding to the phase shift can be performed.

According to the above configuration, by performing frequency analysis, only significant power spectrum data is extracted from power spectrum data that can find fine characteristics, and predictive operation is performed on the input audio data D10 by means of a predictive coefficient based on the result of classification. Thereby, the input audio data D10 can be converted to audio data D16 further improved in sound quality.

Note that, in the aforementioned embodiment, it has dealt with the case where multiplication is performed by means of Hamming window as window function. However, the present invention is not only limited to this but also multiplication may be performed by other various window function, e.g., Hanning window, Blackman window, etc., instead of the Hamming window, or the spectrum processing part may perform multiplication by means of desired window function according to the frequency characteristic of an input digital audio signal by previously enabling multiplication by means of various window function (Hamming window, Hanning window, Blackman window, etc.) in the spectrum processing part.

In this connection, when the spectrum processing part performs multiplication by means of Hanning window, the spectrum processing part calculates multiplication data by multiplying a class tap supplied from a sliced part by Hanning window being the following equation:

$$W[k]=0.50+0.50*\cos(\pi*k/N) \quad \langle k=0, \ldots, N\text{-}1\rangle \tag{16}$$

On the other hand, when the spectrum processing part performs multiplication using Blackman window, the spectrum processing part calculates multiplication data by multiplying the class tap supplied from the sliced part by Blackman window being the following equation:

$$W[k]=0.42+0.50*\cos(\pi*k/N)+0.08*\cos(2\pi*k/N) \quad \langle k=0, \ldots, N\text{-}1\rangle \tag{17}$$

In the aforementioned embodiment, it has dealt with the case where fast Fourier transform is applied. However, the present invention is not only limited to this but also other various frequency analysis means, e.g., discrete Fourier transformer (DFT), discrete cosine transform (DCT), maximum entropy method, method by linear predictive analysis, etc., can be applied.

In the aforementioned embodiment, it has dealt with the case where the spectrum processing part 11 sets only left power spectrum data group AR1 (FIG. 5) from zero value to N/2 as an object to be extracted. However, the present invention is not only limited to this but also only the right power spectrum data group AR2 (FIG. 5) may be set as an object to be extracted.

In this case, load on processing in the audio signal processing device 10 can be further reduced, and processing speed can be further improved.

Furthermore, in the aforementioned embodiment, it has dealt with the case where ADRC is performed as pattern generating means for generating compressed data pattern. However, the present invention is not only limited to this but also the compression means such as for example differential pulse code modulation (DPCM), vector quantize (VQ). In short, it may be compression means that can represent the pattern of signal waveform by few classes.

Figure 7:
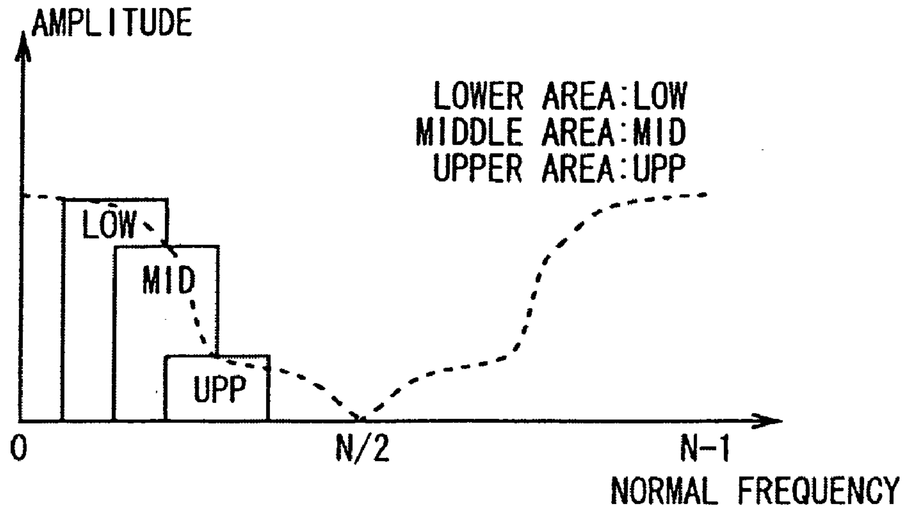
FIG. 7 is a schematic diagram showing an example of the selection of power spectrum data.
Figure 8:
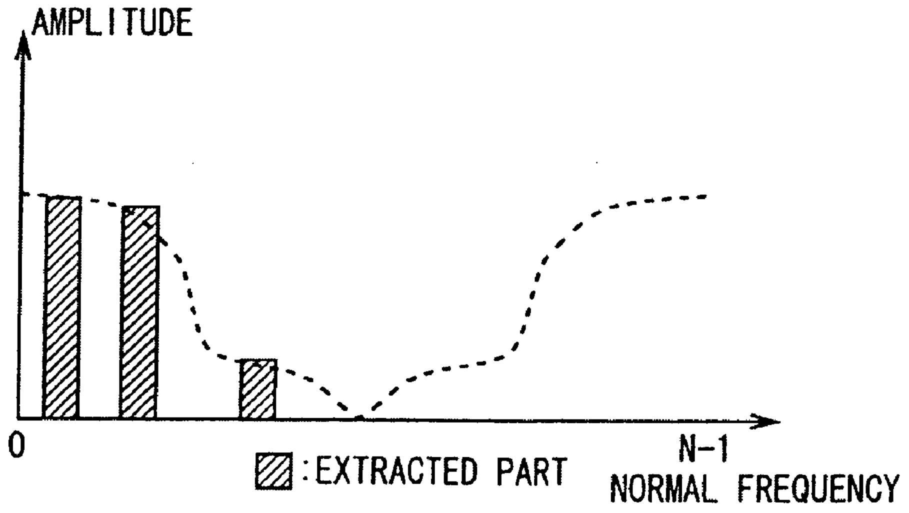
FIG. 8 is a schematic diagram showing an example of the selection of power spectrum data.
Figure 9:
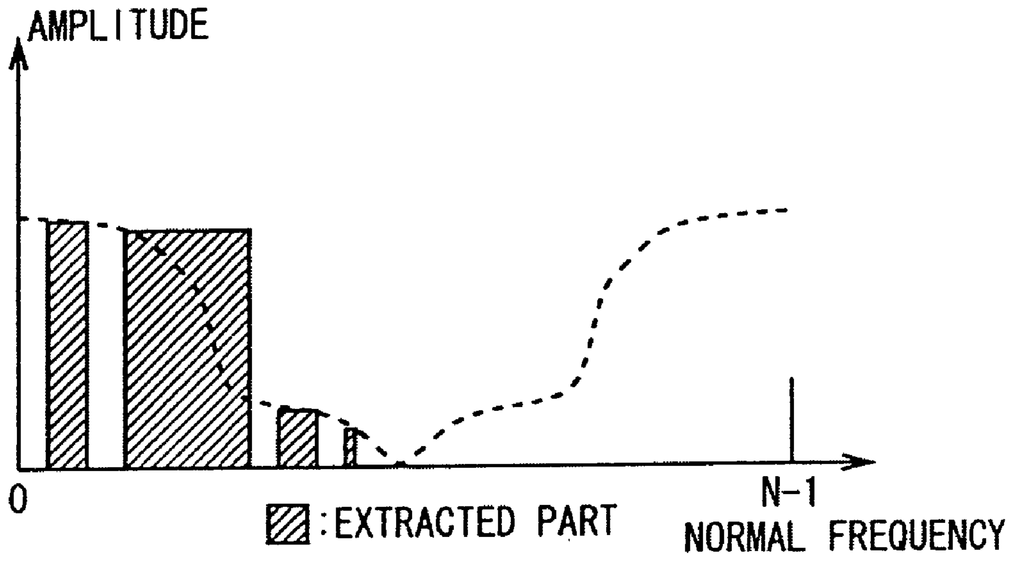
FIG. 9 is a schematic diagram showing an example of the selection of power spectrum data.

In the aforementioned embodiment, it has dealt with the case where human's voice and sound is selected (that is, frequency component to be extracted is 500 Hz to 4 kHz or 20 Hz to 20 kHz) as selective area setting means that can be selectively operated by a user by hand. However, the present invention is not limited to this but also other various selective area setting means such as selecting one of the frequency components, upper area (UPP), middle area (MID) and low area (LOW), as shown in FIG. 7, dispersedly selecting a frequency component as shown in FIG. 8, and further, unevenly selecting frequency components in a frequency band as shown in FIG. 9, can be applied.

In this case, in the audio signal processing device, programming which corresponds to newly provided selective area setting means is performed and stored in predetermined storage means such as an HDD, a ROM. Thereby, also in the case where a user selectively operated the selective area setting means newly provided by hand via the input means 18, control data according to the selective area setting means selected at this time is supplied from the input means to the spectrum processing part. Thereby, the spectrum processing part extracts power spectrum data from desired frequency component by the program corresponding to the selective area setting means newly provided.

By such arrangement, other various selective area setting means can be applied, and significant power spectrum data according to user's intent can be extracted.

Furthermore, in the aforementioned embodiment, it has dealt with the case where the audio signal processing device 10 (FIG. 2) executes class code generating processing according to a program. However, the present invention is not only limited this but also these functions may be realized by a hardware configuration and provided in various digital signal processing device (e.g., rate converter, oversampling processor, PCM error correcting device for correcting pulse code modulation (PCM) digital sound error, used in broadcasting satellite (BS) broadcasting etc.) Or each function part may be realized by loading these programs in various digital signal processing devices from a program storage medium (FDD, optical disk, etc.) storing a program to realize each function.

According to the present invention as described above, power spectrum data is calculated from a digital audio signal. A part of the power spectrum data is extracted from the calculated power spectrum data. Classification is performed based on the extracted part of power spectrum data. And the digital audio signal is converted by a predicting method corresponding to the classified class. Thereby, conversion further adapted to the characteristic of the digital audio signal can be performed, and the signal can be converted to a digital audio signal of high sound quality in that the reproducibility of the waveform of the digital audio signal has further improved.

INDUSTRIAL CAPABILITY

The present invention is applicable to a rate converter, a PCM decoding device, an audio signal processing device or the like that performs interpolation of data on a digital signal.

The invention claimed is:

1. A learning method for generating a predictive coefficient to be used in a digital signal processing apparatus for converting a digital audio signal, comprising:

generating a learner digital audio signal by deteriorating a desired digital audio signal;

calculating power spectrum data from said learner digital audio signal;

extracting a part of power spectrum data from said power spectrum data;

classifying said digital audio signal based on said part of power spectrum data to output class data; and calculating a predictive coefficient for said class data based on said desired digital audio signal and said learner digital audio signal.

2. A learning apparatus for generating a predictive coefficient to be used in a digital signal processing apparatus for converting a digital audio signal, comprising:

learner digital audio signal generating means for generating a learner digital audio signal by deteriorating a desired digital audio signal;

frequency analysis means for calculating power spectrum data from said learner digital audio signal;

spectrum data extracting means for extracting a part of power spectrum data from said power spectrum data;

classification means for classifying said digital audio signal based on said part of power spectrum data and for outputting class data; and predictive coefficient calculating means for calculating a predictive coefficient for said class data based on said desired digital audio signal and said learner digital audio signal.

3. A program storage medium for making a digital signal processing apparatus execute a program comprising:

generating a learner digital audio signal by deteriorating a desired digital audio signal;

calculating power spectrum data from said learner digital audio signal;

extracting a part of power spectrum data from said power spectrum data;

classifying said digital audio signal based on said part of power spectrum data to output class data; and calculating a predictive coefficient for said class data based on said desired digital audio signal and said learner digital audio signal.

* * * * *